(12) United States Patent
Sanguinetti

(10) Patent No.: US 7,818,029 B2
(45) Date of Patent: Oct. 19, 2010

(54) WIRELESS COMMUNICATIONS CIRCUITRY WITH ANTENNA SHARING CAPABILITIES FOR HANDHELD ELECTRONIC DEVICES

(75) Inventor: Louie J. Sanguinetti, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 717 days.

(21) Appl. No.: 11/786,606

(22) Filed: Apr. 11, 2007

(65) Prior Publication Data
US 2008/0253345 A1  Oct. 16, 2008

(51) Int. Cl.
H04M 1/00 (2006.01)

(52) U.S. Cl. .................. 455/552.1; 455/553.1; 455/78; 455/82; 455/83; 370/339

(58) Field of Classification Search .............. 455/552.1, 455/553.1, 78, 82, 83; 370/339
See application file for complete search history.

(56) References Cited

U.S. PATENT DOCUMENTS

| | | | |
|---|---|---|---|
| 4,010,426 A | | 3/1977 | Rambo |
| 5,301,367 A | * | 4/1994 | Heinonen ..................... 455/76 |
| 5,386,203 A | * | 1/1995 | Ishihara ....................... 333/129 |
| 5,471,652 A | * | 11/1995 | Hulkko ......................... 455/76 |
| 5,768,691 A | * | 6/1998 | Matero et al. .................. 455/78 |
| 5,789,995 A | * | 8/1998 | Minasi ......................... 333/103 |
| 5,881,370 A | | 3/1999 | Pottala et al. |
| 6,018,644 A | * | 1/2000 | Minarik ......................... 455/82 |
| 6,553,210 B1 | | 4/2003 | Lindemann et al. |
| 6,717,516 B2 | | 4/2004 | Bridgelall |
| 6,813,320 B1 | | 11/2004 | Claxton et al. |
| 6,882,631 B1 | | 4/2005 | Tiedemann |
| 7,106,816 B2 | | 9/2006 | Filipovic |
| 7,123,883 B2 | | 10/2006 | Mages |
| 2004/0038644 A1 | | 2/2004 | Jimenez et al. |
| 2004/0192222 A1 | * | 9/2004 | Vaisanen et al. .............. 455/78 |
| 2005/0079828 A1 | * | 4/2005 | Tasaka ......................... 455/78 |
| 2005/0245202 A1 | | 11/2005 | Ranta et al. |
| 2006/0030265 A1 | * | 2/2006 | Desai et al. ................. 455/41.2 |
| 2006/0194538 A1 | * | 8/2006 | Palin et al. .................. 455/41.2 |
| 2006/0205436 A1 | | 9/2006 | Liu et al. |
| 2008/0139118 A1 | | 6/2008 | Sanguinetti |

OTHER PUBLICATIONS

ANADIGICS "AWL6254 Product Brief." Rev 1.2, Sep. 2005.

* cited by examiner

*Primary Examiner*—Edward Urban
*Assistant Examiner*—Ganiyu Hanidu
(74) *Attorney, Agent, or Firm*—Treyz Law Group; G. Victor Treyz; David C. Kellogg

(57) ABSTRACT

Handheld electronic devices are provided that contain wireless communications circuitry. The wireless communications circuitry may have first and second transceiver circuits that operate in the same radio-frequency band using different communications protocols. The wireless communications circuitry may have a configurable radio-frequency combiner and divider circuit that is coupled between an antenna and the first and second transceiver circuits. The combiner and divider circuit can be configured to support simultaneous use of the antenna by the first and second transceiver circuits. When simultaneous use is not required, the combiner and divider circuit can be used by either the first transceiver circuit or the second transceiver circuit.

30 Claims, 10 Drawing Sheets

|  | TRANS1 ON TRANS3 OFF | TRANS1 OFF TRANS2 ON | TRANS1 ON TRANS2 ON |
| --- | --- | --- | --- |
| TRANS1_ACTIVE | 1 | 0 | 1 |
| TRANS2_ACTIVE | 0 | 1 | 1 |
| SW1 | ON | OFF | ON |
| SW2 | OFF | ON | ON |
| SW3 | OFF | OFF | ON |

WIRELESS COMMUNICATIONS CIRCUITRY WITH ANTENNA SHARING CAPABILITIES FOR HANDHELD ELECTRONIC DEVICES

BACKGROUND

This invention relates generally to wireless communications circuitry, and more particularly, to wireless communications circuitry with that supports antenna sharing on handheld electronic devices.

Handheld electronic-devices are becoming increasingly popular. Examples of handheld devices include handheld computers, cellular telephones, media players, and hybrid devices that include the functionality of multiple devices of this type.

Due in part to their mobile nature, handheld electronic devices are often provided with wireless communications capabilities. Handheld electronic devices may use long-range wireless communications to communicate with wireless base stations. For example, cellular telephones may communicate using cellular telephone bands at 850 MHz, 900 MHz, 1800 MHz, and 1900 MHz (e.g., the main Global System for Mobile Communications or GSM cellular telephone bands). Handheld electronic devices may also use short-range wireless communications links. For example, handheld electronic devices may communicate using the WiFi® (IEEE 802.11) band at 2.4 GHz and the Bluetooth® band at 2.4 GHz.

To satisfy consumer demand for small form factor wireless devices, manufacturers are continually striving to reduce the number of components that are used. For example, in some wireless designs a single antenna is shared by two transceivers. Because there is only a single antenna with this type of approach, device size is minimized.

It is not always desirable to share an antenna in a wireless device. In conventional shared antenna arrangements with two transceivers operating on a shared communications frequency, the two transceivers compete with each other for use of the antenna. If, for example, data is being received by one of the transceivers, data cannot be received by the other transceiver. This may lead to dropped data packets and service interruptions.

It would therefore be desirable to be able to provide improved wireless communications circuitry for wireless handheld electronic devices.

SUMMARY

In accordance with an embodiment of the present invention, a handheld electronic device with wireless communications circuitry is provided. The handheld electronic device may have cellular telephone, music player, or handheld computer functionality. The wireless communications circuitry may have multiple transceivers that share an antenna.

The wireless communications circuitry may have first and second transceiver circuits that operate in a common frequency band using different communications protocols. The first transceiver circuit may be, for example, a wireless local area network (WLAN) transceiver integrated circuit that handles IEEE 802.11 traffic at 2.4 GHz. The second transceiver circuit may be a Bluetooth transceiver circuit that handles Bluetooth data at 2.4 GHz.

The wireless communications circuitry may have a radio-frequency combiner and divider circuit that is coupled between and antenna and the first and second transceiver circuits. The combiner and divider circuit may be configured to support simultaneous use of both the first and second transceiver circuits or can be configured to support use of only the first or only the second transceiver circuit.

Further features of the invention, its nature and various advantages will be more apparent from the accompanying drawings and the following detailed description of the preferred embodiments.

BRIEF DESCRIPTION OF THE DRAWINGS

FIG. 8 is a table of illustrative settings and operating modes for a configurable splitter circuitry of the type shown in FIG. 7 in accordance with an embodiment of the present invention.

DETAILED DESCRIPTION

The present invention relates generally to wireless communications and more particularly, to wireless communications circuitry that supports antenna sharing in electronic devices such as portable electronic devices.

Figure 1:
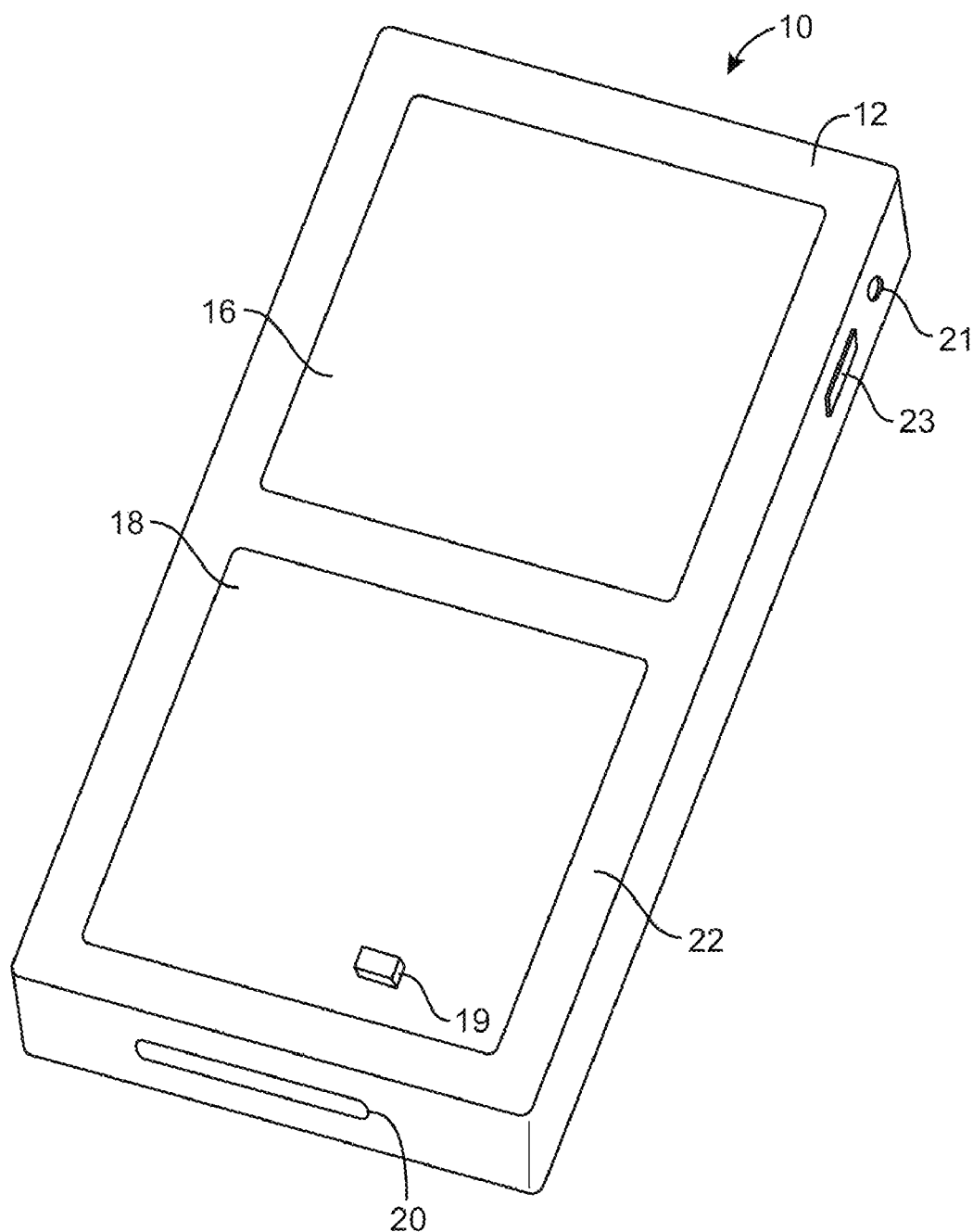
FIG. 1 is a perspective view of an illustrative handheld electronic device with wireless communications circuitry in accordance with an embodiment of the present invention.

An illustrative portable electronic device in accordance with an embodiment of the present invention is shown in FIG. 1. Portable electronic devices such as illustrative portable electronic device 10 may be laptop computers or small portable computers such as those sometimes referred to as ultraportables. Portable electronic devices may also be somewhat smaller devices. Examples of smaller portable electronic devices include wrist-watch devices, pendant devices, headphone and earpiece devices, and other wearable and miniature devices.

With one suitable arrangement, the portable electronic devices are handheld electronic devices. Space is at a premium in handheld electronics devices, so antenna-sharing arrangements for handheld electronic devices can be particularly advantageous. The use of handheld devices is therefore generally described herein as an example, although any suitable electronic device may be used with the wireless communications functions of the present invention, if desired.

Handheld devices may be, for example, cellular telephones, media players with wireless communications capabilities, handheld computers (also sometimes called personal digital assistants), remote controllers, global positioning system (GPS) devices, and handheld gaming devices. The handheld devices of the invention may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples. Device 10 may be any suitable portable or handheld electronic device.

Device 10 includes housing 12 and includes at least one antenna for handling wireless communications. Housing 12, which is sometimes referred to as a case, may be formed of any suitable materials including, plastic, wood, glass, ceramics, metal, or other suitable materials, or a combination of these materials. In some situations, case 12 may be a dielectric or other low-conductivity material, so that the operation of conductive antenna elements that are located in proximity to case 12 is not disrupted. In other situations, case 12 may be formed from metal elements. In scenarios in which case 12 is formed from metal elements, one or more of the metal elements may be used as part of the antenna(s) in device 10.

Any suitable type of antenna may be used to support wireless communications in device 10. Examples of suitable antenna types include antennas with resonating elements that are formed from a patch antenna structure, a planar inverted-F antenna structure, a helical antenna structure, etc. To minimize device volume, at least one of the antennas in device 10 may be shared between two transceiver circuits.

Handheld electronic device 10 may have input-output devices such as a display screen 16, buttons such as button 23, user input control devices 18 such as button 19, and input-output components such as port 20 and input-output jack 21. Display screen 16 may be, for example, a liquid crystal display (LCD), an organic light-emitting diode (OLED) display, a plasma display, or multiple displays that use one or more different display technologies. As shown in the example of FIG. 1, display screens such as display screen 16 can be mounted on front face 22 of handheld electronic device 10. If desired, displays such as display 16 can be mounted on the rear face of handheld electronic device 10, on a side of device 10, on a flip-up portion of device 10 that is attached to a main body portion of device 10 by a hinge (for example), or using any other suitable mounting arrangement.

A user of handheld device 10 may supply input commands using user input interface 18. User input interface 18 may include buttons (e.g., alphanumeric keys, power on-off, power-on, power-off, and other specialized buttons, etc.), a touch pad, pointing stick, or other cursor control device, a touch screen (e.g., a touch screen implemented as part of screen 16), or any other suitable interface for controlling device 10. Although shown schematically as being formed on the top face 22 of handheld electronic device 10 in the example of FIG. 1, user input interface 18 may generally be formed on any suitable portion of handheld electronic device 10. For example, a button such as button 23 (which may be considered to be part of input interface 18) or other user interface control may be formed on the side of handheld electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

Handheld device 10 may have ports such as bus connector 20 and jack 21 that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, etc. The functions of some or all of these devices and the internal circuitry of the handheld electronic device can be controlled using input interface 18.

Components such as display 16 and user input interface 18 may cover most of the available surface area on the front face 22 of device 10 (as shown in the example of FIG. 1) or may occupy only a small portion of the front face 22. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antenna of handheld electronic device 10 to function properly without being disrupted by the electronic components.

Figure 2:
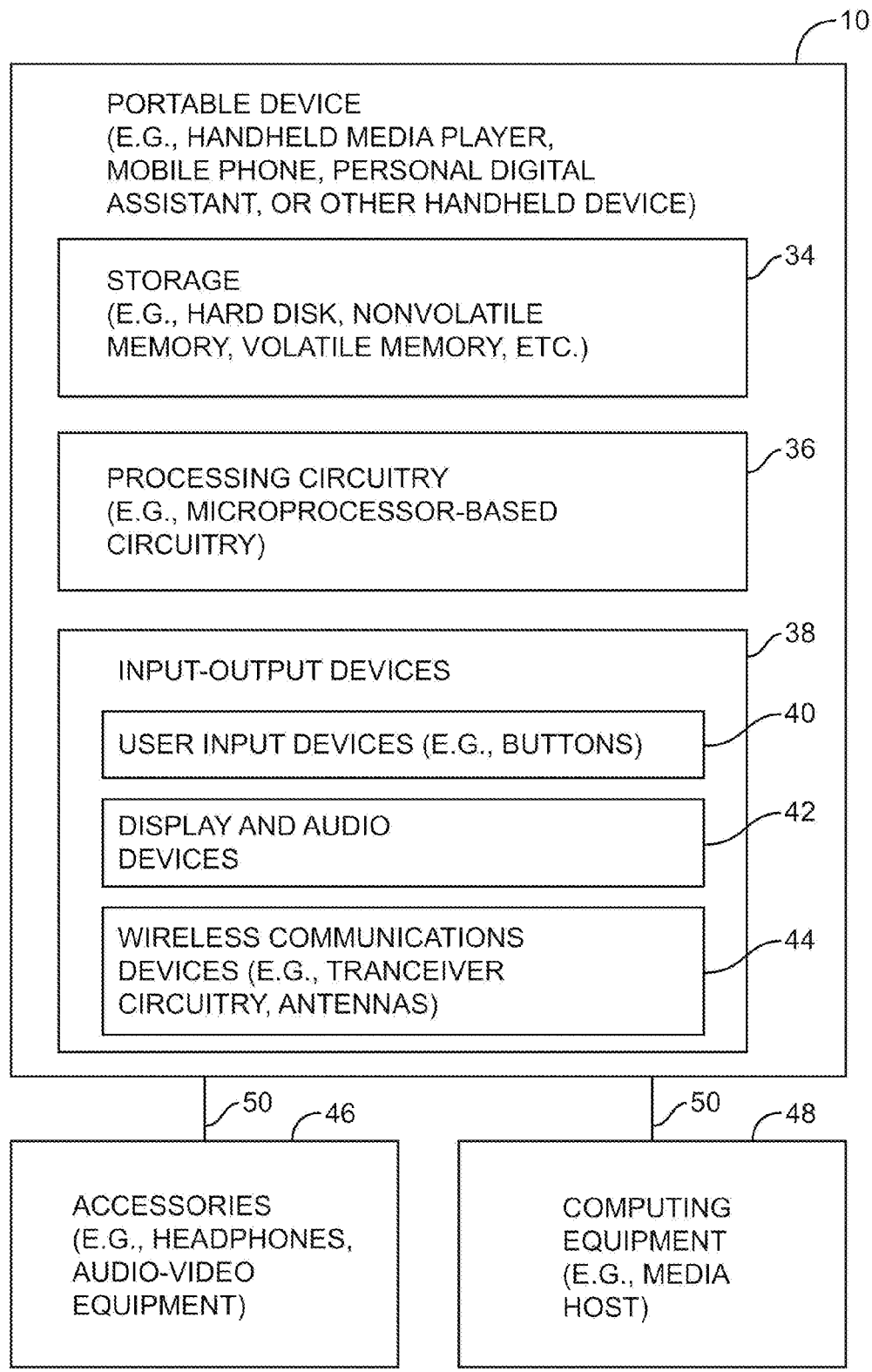
FIG. 2 is a schematic diagram of an illustrative handheld electronic device with wireless communications circuitry in accordance with an embodiment of the present invention.

A schematic diagram of an embodiment of an illustrative handheld electronic device is shown in FIG. 2. Handheld device 10 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as WiFi®), protocols for other short-range wireless communications links such as the Bluetooth® protocol, etc.)

Input-output devices 38 may be used to allow data to be supplied to device 10 and to allow data to be provided from device 10 to external devices. Display screen 16 and user input interface 18 of FIG. 1 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications).

Device 10 can communicate with external devices such as accessories 46 and computing equipment 48, as shown by paths 50. Paths 50 may include wired and wireless paths. Accessories 46 may include headphones (e.g., a wireless cellular headset or audio headphones) and audio-video equipment (e.g., wireless speakers, a game controller, or other equipment that receives and plays audio and video content). In one illustrative scenario, paths 50 may include a wireless Bluetooth path that is used to support communications between a Bluetooth headset (one of accessories 46) and device 10 and a wireless local area network (WLAN) path (e.g., a WiFi path) that is used to support communications between device 10 and computing equipment 48.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another handheld electronic device 10), or any other suitable computing equipment.

Wireless communications devices 44 may be used to support local and remote wireless links.

Examples of local wireless links include WiFi and Bluetooth links and wireless universal serial bus (USB) links. Because wireless WiFi links are typically used to establish data links with local area networks, links such as WiFi links are sometimes referred to as WLAN links. The local wireless links may operate in any suitable frequency band. For example, WLAN links may operate at 2.4 GHz or 5.6 GHz (as examples), whereas Bluetooth links may operate at 2.4 GHz. The frequencies that are used to support these local links in device 10 may depend on the country in which device 10 is being deployed (e.g., to comply with local regulations), the available hardware of the WLAN or other equipment with which device 10 is connecting, and other factors.

With one suitable arrangement, which is sometimes described herein as an example, device 10 communicates using both the popular 2.4 GHz WiFi bands (802.11(b) and/or 802.11(g)) and the 2.4 GHz Bluetooth band using the same antenna. In this type of configuration, the antenna is designed to operate at a frequency of 2.4 GHz, so the antenna is suitable for use with the 2.4 GHz radio-frequency signals that are used in connection with both the WiFi and Bluetooth communications protocols. Circuitry 44 may include a configurable combiner and divider circuit that allows WiFi and Bluetooth signals to be handled simultaneously.

If desired, wireless communications devices 44 may include circuitry for communicating over remote communications links. Typical remote link communications frequency bands include the cellular telephone bands at 850 MHz, 900 MHz, 1800 MHz, and 1900 MHz, the global positioning system (GPS) band at 1575 MHz, and data service bands such as the 3G data communications band at 2170 MHz band (commonly referred to as UMTS or Universal Mobile Telecommunications System). In these illustrative remote communications links, data is transmitted over links 50 that are one or more miles long, whereas in short-range links 50, a wireless signal is typically used to convey data over tens or hundreds of feet.

These are merely illustrative communications bands over which wireless devices 44 may operate. Additional local and remote communications bands are expected to be deployed in the future as new wireless services are made available. Wireless devices 44 may be configured to operate over any suitable band or bands to cover any existing or new services of interest. If desired, multiple antennas and/or a broadband antenna may be provided in wireless devices 44 to allow coverage of more bands. At least one of the antennas (e.g., an antenna used for WiFi and Bluetooth communications at a common communications band frequency of 2.4 GHz) may be shared, as this helps reduce the size of wireless communications circuitry 44 and therefore reduces the size of device 10.

In conventional wireless electronic devices in which an antenna is shared between multiple communications bands, switching circuitry is used to switch between different transceiver modules, because simultaneous use of both modules is not supported. While this type of arrangement may be satisfactory in undemanding applications, a shared antenna arrangement that is based solely on conventional switch arrangements can be inadequate in many contemporary situations.

Figure 3:
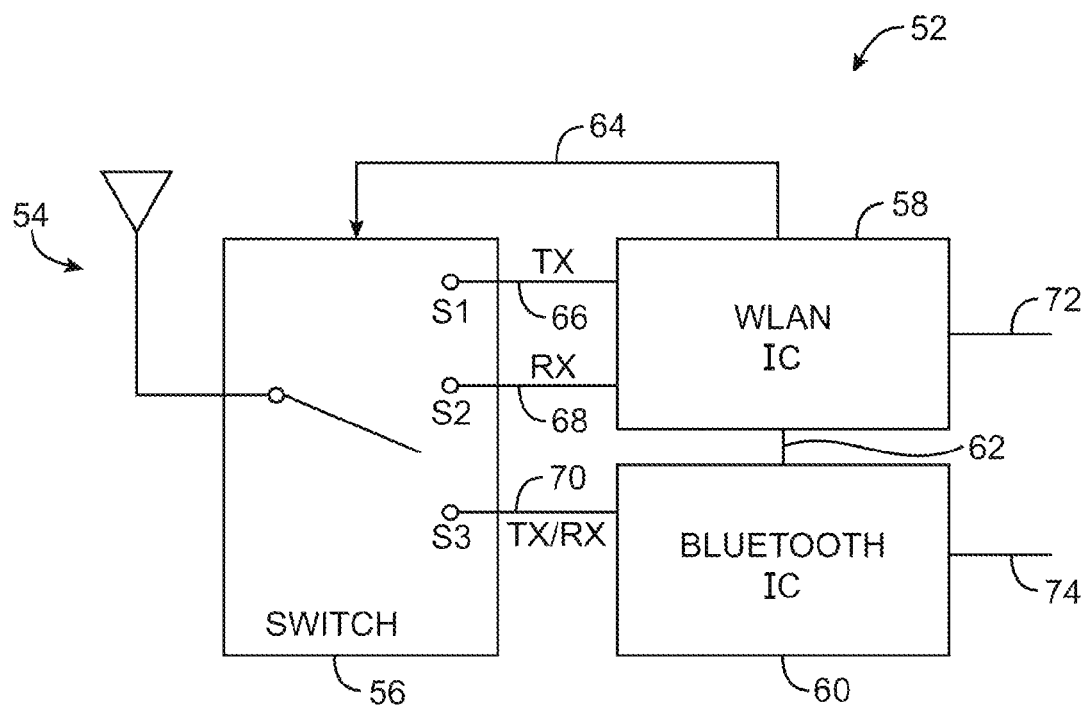
FIG. 3 is a schematic diagram of conventional wireless communications circuitry for a wireless electronic device.

Conventional wireless communications circuitry that is based on a traditional shared-antenna architecture is shown in FIG. 3. Wireless communications circuitry 52 includes antenna 54, which handles radio-frequency signals at a frequency of 2.4 GHz. Switch 56 selectively connects antenna 54 to switch port S1, S2, or S3. Ports Si and S2 are connected to wireless local area network (WLAN) integrated circuit 58 by respective paths 66 and 68. Port S3 is connected to Bluetooth integrated circuit 66 by path 70. Wireless local-area-network integrated circuit 58 includes a WiFi transceiver and control circuitry. Bluetooth integrated circuit 60 includes a Bluetooth transceiver and control circuitry. WLAN circuit 58 and Bluetooth circuit 60 communicate with each other using handshaking path 62. Paths 72 and 74 are used to provide data and control signals to circuits 58 and 66.

WLAN circuit 58 controls the state of switch 56 using control path 64. When it is desired to transmit WLAN data, switch 56 is connected to position S1, so that data can be transmitted from WLAN integrated circuit 58 to antenna 54 over path 66. Switch 56 is connected to position S2 when it is desired to receive data with WLAN circuit 58. In position S2, signals from antenna 54 are conveyed through switch 56 and over path 68 to WLAN circuit 58. Switch 56 has a third position—S3—that is used when it is desired to transmit or receive Bluetooth signals. In transmit mode, Bluetooth signals are transmitted to antenna 54 via transmit/receive path 70 and switch 56. In receive mode, Bluetooth signals that have been received by antenna 54 are conveyed to Bluetooth integrated circuit 60 by switch 56 and path 70.

The conventional arrangement of FIG. 3 allows antenna 54 to be shared. WiFi traffic is handled by WLAN circuit 58 and Bluetooth traffic is handled by Bluetooth circuit 60. Switch 56 can be switched between WLAN circuit 58 and Bluetooth circuit 60, so that circuit 58 and 60 are able to take turns using antenna 54. Although WLAN circuit 58 and Bluetooth circuit 60 cannot be used at the same time, switch 56 can be switched quickly, so that circuits 58 and 60 are able to use antenna 54 in rapid succession.

Because switch 56 cannot be connected to both WLAN circuit 58 and Bluetooth circuit 60 at the same time, it is necessary to prioritize. Consider, as an example, the situation in which a user of communications circuitry 52 is browsing the internet using WLAN circuit 58, while using Bluetooth connection 60 to control a wireless mouse. In this type of situation, circuits 58 and 60 can decide to favor the Bluetooth connection over the WiFi connection. Whenever it is desired to connect to both the WLAN circuit 58 and the Bluetooth circuit 60 at the same time, the Bluetooth circuit is favored.

With this type of prioritization scheme, the user of circuit 52 will be able to use the wireless mouse without noticeable interruption. However, because the Bluetooth connection is favored over the WLAN connection, WLAN data packets will occasionally be dropped.

For example, consider the situation in which Bluetooth activity arises while requested internet data is being transmitted to WLAN circuit 58. To handle the Bluetooth activity, switch 56 will be connected to switch position S3. Bluetooth data has priority over WLAN data, so the fact that WLAN circuit 58 is in the midst of receiving internet data is immaterial and switch 56 is switched to position S3 to ensure that the Bluetooth activity is handled properly.

Placing switch 56 in position S3 allows Bluetooth circuit 60 to transmit and receive Bluetooth data as needed. However, setting switch 56 to position S3 prevents WLAN circuit 58 from receiving the internet data that is being transmitted. As a result, some internet data packets will be at least temporarily lost.

Data interruptions such as these are unavoidable using the conventional wireless communications circuitry arrangement of FIG. 3, because it is not possible to set switch 56 to a position that allows simultaneous transmission or reception of WLAN and Bluetooth data. Although data interruptions such as these may be acceptable in noncritical applications, in some situations the impact of lost data may be severe. For example, a user might desire to use WLAN circuit 58 to support a voice-over-internet-protocol (VOIP) telephone call over the internet, while using a Bluetooth headset. In real-time audio applications such as these, a high quality connection is critical. Using conventional wireless communications circuit 52 of FIG. 3 may cause the VOIP voice signal to break up due to lost data packets.

Figure 4:
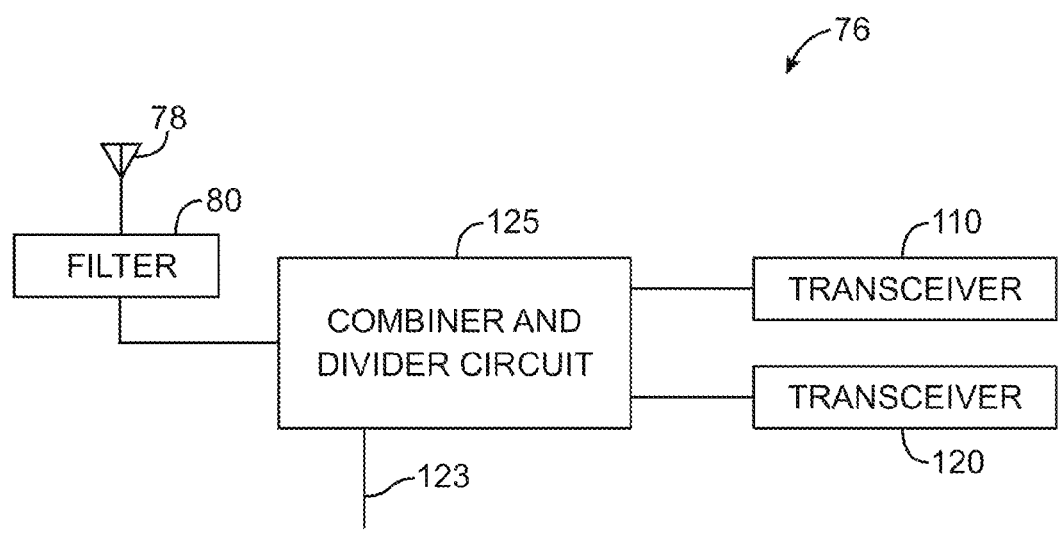
FIG. 4 is a schematic diagram showing how a combiner and divider circuit may be used to allow an antenna to be shared by multiple transceivers in a handheld electronic device in accordance with an embodiment of the present invention.

Wireless communications circuitry 76 in accordance with an illustrative embodiment of the present invention is shown in FIG. 4. As shown in FIG. 4, wireless communications circuitry 76 has an antenna 78. A filter 80 and a direct current (DC) blocking capacitor (not shown) may be used to filter out spurious noise from received signals. Circuitry 76 may include transceivers 110 and 120. Transceiver 110 may, as an example, be a wireless local area network (WLAN) circuit that handles IEEE 802.11 traffic, whereas transceiver 120 may, as an example, be a Bluetooth circuit. If desired, transceivers 110 and 120 may be associated with other types of data traffic.

Radio frequency combiner and divider circuit 125 (which is also sometimes referred to as a configurable radio-frequency coupler) may allow transceivers 110 and 120 to use antenna 78 simultaneously. Control signals may be applied to combiner and divider circuit 125 via control input 123. Using control signals on path 123, circuitry 125 may be placed in various operating modes. For example, circuitry 125 may be placed in a simultaneous operation mode. In this mode transceiver 110 and transceiver 120 may simultaneously transmit or receive data through antenna 78. When transmitting data, combiner and divider circuit 125 serves to combine signals from transceiver 110 and 120 and to provide the resulting combined signals to antenna 78. When receiving data, combiner and divider circuit 125 serves as a divider that separates incoming radio-frequency signals from antenna 78 into two paths—one destined for transceiver 110 and one destined for transceiver 120.

When it is desired to use only one of transceivers 110 and 120, combiner and divider circuit 125 can be configured to direct all incoming and outgoing traffic to the appropriate transceiver. For example, when transceiver 110 is active, control signals can be provided to circuit 125 on path 123 that direct the combiner and divider circuit to route signals exclusively between antenna 78 and transceiver 110. Transceiver 110 can be used to transmit data or to receive data when circuit 125 has been configured in this way.

When configured for simultaneous use of both transceivers, combiner and divider circuit performs the functions of a 3 dB splitter. The loss on each channel in this mode is about 3 dB. When configured to route signals exclusively between antenna 78 and a given one of the transceivers, loss is reduced to about 1 dB. The ability to configure circuit 125 therefore allows the wireless transmit and receive capability of circuitry 76 to be improve by about 2 dB at those points in time when it is not necessary to support simultaneous operation of both transceivers.

Figure 5:
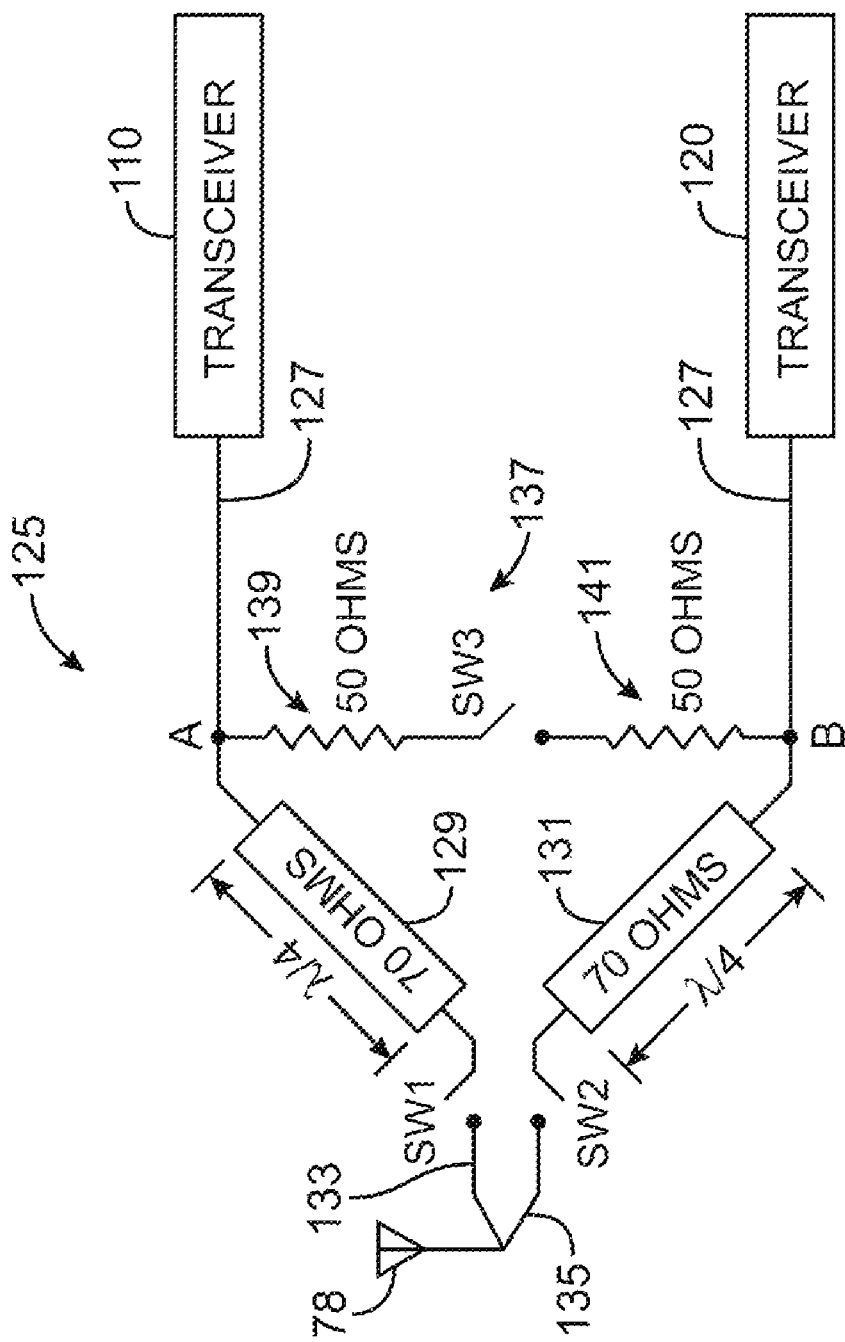
FIG. 5 is a schematic diagram of an illustrative combining and divider circuit based on a configurable splitter that may be used in wireless communications circuitry for a handheld electronic device in accordance with an embodiment of the present invention.

Combiner and divider circuit 125 may be implemented using any suitable circuit architecture. With one suitable arrangement, which is shown in FIG. 5 as an example, combiner and divider 125 may be based on a Wilkinson splitter architecture. As shown in FIG. 5, circuit 125 may have first path 129 and second path 131 which are connected to antenna 78. Path 129 may be selectively connected to antenna 78 through its switch SW1 and line 133. Path 131 is connected to antenna 78 through its switch SW2 and line 135. Filtering circuitry such as filter 80 of FIG. 4 is not shown in FIG. 5 to avoid over-complicating the drawing.

As shown in the example of FIG. 5, first and second branches 129 and 131 may be configured so that at their operating frequency each has an impedance of about 70 ohms and a length of one quarter of a wavelength. In the present example, the operating frequency is about 2.4 GHz.

Third branch 137 of circuit 125 may be connected between nodes A and B. The total impedance of branch path 137 may be about 100 ohms (as an example). The 100 ohm impedance of path 137 may be constructed using a single 100 ohm load, multiple 50 ohm loads (as shown schematically by resistive loads 139 and 141 in FIG. 5), a 25 ohm load and a 75 ohm load, etc. Switch SW3 in path 137 may be used to control whether or not the path of branch 137 is open or closed. Switches SW1 and SW2 may be used to control whether or not signals are conveyed between antenna 78 and transceivers 110 and 120, respectively.

Transceivers 110 and 120 may be connected to branch paths 129 and 131 via paths 127. Paths 127 may have impedances of about 50 ohms (as an example).

Circuit 125 can operate in three modes. In a first mode of operation, switches SW1, SW2, and SW3 may be closed. With SW1 and SW2 closed, incoming signals may be split into first and second paths. The first path may be used to direct incoming signals to transceiver 110. The second path may be used to direct incoming signals to transceiver 120. Because switch S3 is on in this mode of operation, path 137 may be switched into use. The impedance of path 137 may create a network in which the three paths 129, 131, and 137 collectively form a 3 dB splitter.

In a second mode of operation, switch SW1 may be closed and switches SW2 and SW3 may be open. In this mode, path 129 may be switched into use. With switches SW2 and SW3 open, there is a slight impedance mismatch between 50 ohm transmission line paths such as paths 127 and the 70 ohm load of branch 129. This impedance mismatch may lead to a signal loss of about 1 dB. Nevertheless, there can be an improvement of about 2 dB relative to a fixed 3 dB splitter configuration. This 2 dB improvement in signal strength can therefore make it advantageous to place circuit 125 in the second mode of operation whenever it is desired to transmit or receive radio-frequency signals exclusively through the first (upper branch) of circuit 125 (e.g., using transceiver 110 while transceiver 120 remains unused).

In a third mode of operation, switch SW1 may be open, switch SW2 may be closed, and switch SW3 may be open. In this mode path 131 may be switched into use and signals may be conveyed between antenna 78 and transceiver 120 exclusively through path 131.

Figure 6:
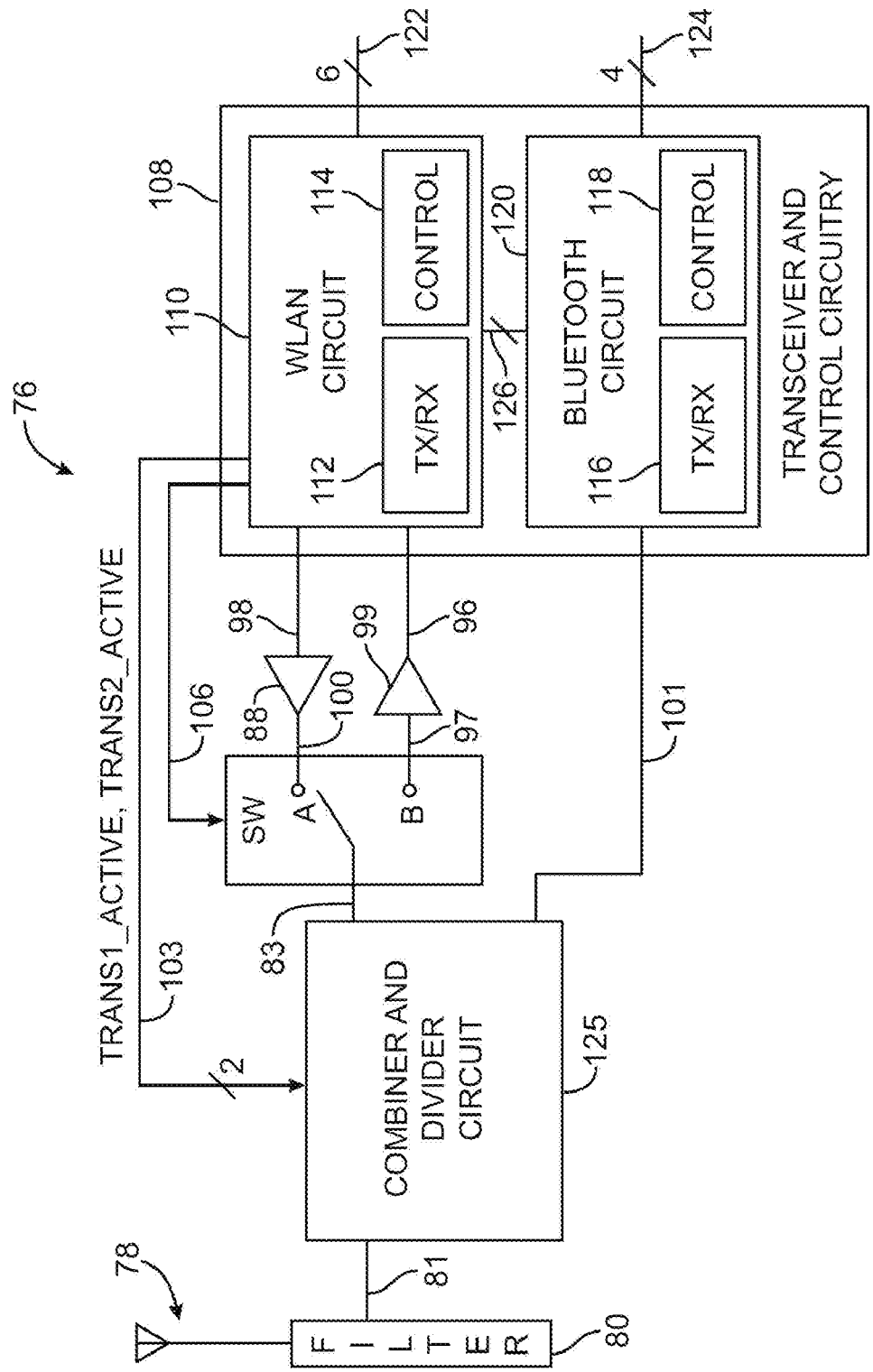
FIG. 6 is a schematic diagram of illustrative wireless communications circuitry containing a wireless local area network circuit and a Bluetooth circuit in accordance with an embodiment of the present invention.

FIG. 6 shows how wireless communications circuitry 76 may include a combiner and divider circuit. Circuitry 76 may include transceiver and control circuitry 108. Transceiver and control circuitry 108 may contain two or more transceiver circuits such as wireless local-area-network (WLAN) circuit 110 and Bluetooth circuit 120. For clarity, a two-transceiver-circuit embodiment is described herein.

WLAN transceiver circuit 110 may be, for example, an integrated circuit that handles IEEE 802.11(b) or 802.11(g) signals using WiFi transceiver 112 and control circuitry 114. Bluetooth transceiver circuit 120 may be, for example, an integrated circuit that handles Bluetooth signals using Bluetooth transceiver 116 and control circuitry 118. Circuits 110 and 120 may be provided as two separate integrated circuits that are mounted on a common circuit board, using a single integrated circuit, or using more than two integrated circuits. With one suitable arrangement, WLAN circuit 110 is an integrated circuit such as Part No. 88W8686 of Marvell Semiconductor, Inc. of Santa Clara, Calif. and Bluetooth circuit 120 is an integrated circuit such as a BlueCore4 device of CSR, Cambridge, England. Circuits 110 and 120 may communicate with each other over handshaking path 126.

Each transceiver circuit may handle a different type of wireless data traffic. In the example of FIG. 6, WiFi traffic is handled using wireless local-area-network (WLAN) circuit 110 and Bluetooth traffic is handled using Bluetooth circuit 120. Each of these circuits interfaces with antenna 78 and with circuitry on the handheld electronic device in which wireless communications circuitry 76 is being used.

Data and control paths 122 and 124 may be used to form communications paths between transceiver and control circuitry 108 and other circuitry on device 10 such as processing circuitry 36 of FIG. 2. Paths 122 and 124 may be used to support any suitable type of data communications. As an example, path 122 may be used to convey control and user data using the so-called secure digital input/output (SDIO) protocol. Paths 124 and 122 may be formed of any suitable number of conductive lines. In the example of FIG. 6, path 122 has been formed from a six-line bus and path 124 has been formed from a four-line bus. This is merely illustrative. Paths such as paths 122 and 124 may be formed from single lines or using larger or smaller busses of multiple lines, if desired.

WLAN circuit 110 may transmit WLAN data wirelessly using data transmission path 98 and may receive WLAN data wirelessly using data reception path 96. Transmitted data on path 98 may be amplified by power amplifier 88. Corresponding amplified versions of the transmitted data signals on path 98 may be provided to switch SW over path 100. To transmit data over antenna 78, control signals may be issued on path 106 that direct switch SW to connect path 100 to path 83 (switch position A). Combiner and divider circuit 125 may be configured to electrically connect path 83 to path 81 and antenna 78 and to thereby allow transceiver circuit 110 to be used. Received data from antenna 78 may be routed to path 97 when switch SW has been placed in switch position B. This received data may be amplified by an optional amplifier 99 and provided to transceiver circuit 110 via path 96. Switch SW may be formed using any suitable switching technology. For example, switch SW may be a single-pole double throw switch based on a field-effect transistors (FETs).

As shown in this example, switch SW and amplifiers 88 and 99 may be provided separate from transceiver circuit 110. Similar switching circuitry and amplifier circuitry may be provided internally, as part of transceiver circuit 110, if desired. In the FIG. 6 example, transceiver circuit 120 contains internal switch and amplifier circuitry. This internal circuitry allows signals to be transmitted from transceiver circuit 120 to combiner and divider 125 over path 101 and allows signals from combiner and divider 125 to be conveyed to transceiver circuit 120. The internal switch and amplifier circuitry of transceiver circuit 120 may, if desired, be provided using an external switch and amplifier arrangement as described in connection with transceiver circuit 110.

The settings of switch SW and the comparable settings of the internal circuitry in transceiver circuit 120 determine whether paths 83 and 101 are being used to transmit data or are being used to receive data. Combiner and divider circuit 125 may also be configured appropriately. Any suitable control arrangement may be used to control the operation of combiner and divider circuit 125. As shown in the example of FIG. 6, a two-line path 103 may be used to convey control signals to combiner and divider circuit 125 from transceiver and control circuitry 108 (e.g., from transceiver circuit 110). This is merely illustrative. For example, a control path having three lines and three control terminals may be used to convey the control signals if desired.

The operating mode of combiner and divider circuit 125 may be selected based on which transceiver circuits are active. When only transceiver circuit 110 is active, signal TRANS1_ACTIVE on path 103 may be high and signal TRANS2_ACTIVE on path 103 may be low. In this mode, combiner and divider circuit 125 may be configured to convey signals between transceiver circuit 110 and antenna 78 with only moderate losses (e.g., about 1 dB due to the impedance mismatch between branch 129 and surrounding 50 ohm transmission lines). When only transceiver circuit 120 is active, signal TRANS2_ACTIVE on path 103 may be high and signal TRANS1_ACTIVE on path 103 may be low. In this mode, combiner and divider circuit 125 may be configured to convey signals between transceiver circuit 120 and antenna 78 with only minimal losses (e.g., about 1 dB). If it is desired to operate transceivers 110 and 120 simultaneously, both signals TRANS1_ACTIVE and TRANS2_ACTIVE may be taken high, configuring circuit 125 as a 3 dB coupler.

Figure 7:
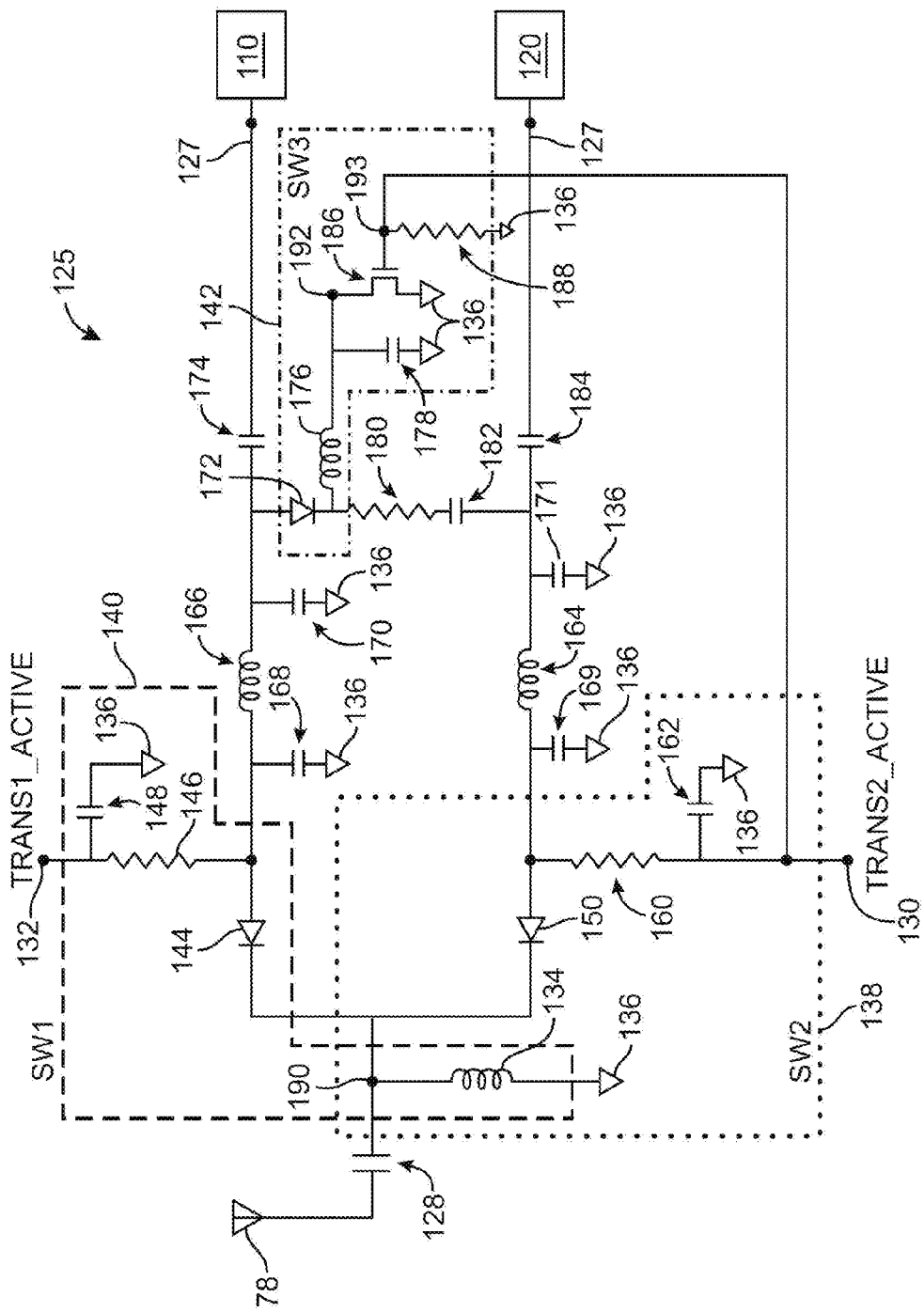
FIG. 7 is a circuit diagram of illustrative configurable splitter circuitry that may be used in a combining and divider circuit in a handheld electronic device in accordance with an embodiment of the present invention.

An illustrative circuit that may be used for combiner and divider circuit 125 is shown in FIG. 7. Control signal TRANS1_ACTIVE may be applied to terminal 132. Terminal 130 may receive control signal TRANS2_ACTIVE. Signals may be grounded at ground terminals 136.

Blocking capacitor 128 may be used to help protect circuit 125 from the potentially harmful effects of electrostatic discharge (ESD). Inductor 134 may be used to establish DC ground at node 190. An inductance value may be chosen for inductor 134 so that the impedance of inductor 134 is sufficiently large at the operating frequency of circuit 125 (e.g., 500 ohms at an operating frequency of 2.4 GHz) and only a negligible amount of radio-frequency signal is shunted to ground 136.

Switch SW1 of FIG. 5 may be formed from inductor 134, diode 144, resistor 146 (e.g., a 1000 ohm resistor), and capacitor 148 (e.g., a 10 pF capacitor), as shown by dashed line 140 in FIG. 7. Switch SW2 of FIG. 5 may be formed by inductor 134, diode 150, resistor 160 (e.g., a 1000 ohm resistor), and capacitor 162 (e.g., a 10 pF capacitor), as shown by dotted line 138 in FIG. 7. Dashed-and-dotted line 142 shows how switch SW3 of FIG. 5 may be formed from diode 172, inductor 176 (e.g., a 27 mH inductor), capacitor 178 (e.g., a 10 pF capacitor), transistor 186, and resistor 188.

Diodes such as diodes 144, 159, and 172 may be diodes suitable for radio-frequency switching applications such as p-i-n diodes having low off capacitances.

When diode 144 is off, its resistance is high (e.g., greater than 100 kilo ohms) and its junction and parasitic capacitance is low, so that radio-frequency signals are blocked (i.e., switch SW1 is open). When diode 144 is on, its resistance is negligible (e.g., about 3 ohms) and it allows radio-frequency signals to pass (i.e., switch SW1 is closed). Capacitor 148 may serve as a low pass filter that prevents radio-frequency signals from reaching control terminal 132.

When control terminal 132 is taken high by asserting the TRANS1_ACTIVE signal, current flows through resistor 146, diode 144, and inductor 134. In this situation, diode 144 is forward biased and switch SW1 is closed. When control terminal 132 is low, diode 144 is reverse biased (or at least not forward biased) and switch SW1 is open.

Similarly, when control terminal 130 is taken high by asserting the TRANS2_ACTIVE signal, current flows through resistor 160, diode 150, and inductor 134. In this situation, diode 150 is forward biased and switch SW2 is closed. When control terminal 130 is low (i.e., TRANS2_ACTIVE has been deasserted), diode 150 is reverse biased (or at least not forward biased) and switch SW2 is open.

Capacitor 168, inductor 166, and capacitor 170 may be used to form the 70 ohm impedance path for first branch 129 (FIG. 5). Similarly, capacitor 169, inductor 164, and capacitor 171 may be used to form the 70 ohm impedance path for second branch 131. Resistor 180 may be used to form a 100 ohm path for branch 137 of FIG. 5.

Inductor 176 may be used to provide a direct current (DC) path for current to ground 136 while forming an L-C circuit with capacitor 178 (e.g., a 10 pF capacitor) that prevents radio-frequency signals from being diverted into switch SW3. Transistor 186 may serve as an inverter that converts the signal TRANS2_ACTIVE on line 130 into NOT TRANS2_ACTIVE on node 192. Resistor 188 may serve as a pull-down resistor. In the event that the transceiver circuitry in device 10 is powered down so that an unknown signal voltage appears on control lines such as TRANS1_ACTIVE and TRANS2_ACTIVE, resistor 188 may help to pull node 193 low and thereby prevent the TRANS2_ACTIVE line 130 from floating and placing switch SW3 in an unknown state.

When signal TRANS1_ACTIVE is low, diode 172 is reverse biased (or at least not forward biased) and switch SW3 is off. When signal TRANS1_ACTIVE is high and NOT TRANS2_ACTIVE is low, a current flows through resistor 146, inductor 166, diode 172, inductor 176, and transistor 186 to ground 136, forward biasing diode 172 and turning switch SW3 on. When switch SW3 is on and current is flowing through diode 172, capacitor 182 may serve to prevent DC current from flowing through diode 150 and erroneously turning diode 150 on.

Capacitors 174 and 184 may be used to protect transceivers 110 and 120 from damage due to DC currents.

A table illustrating the states of switches SW1, SW2, and SW3 that may be produced as a result of various control signal states for TRANS1_ACTIVE and TRANS2_ACTIVE is shown in FIG. 8. As shown in FIG. 8, signals TRANS1_ACTIVE and TRANS2_ACTIVE can be either high (i.e., a logic one) or low (i.e., a logic zero). Switches SW1, SW2, and SW3 can be either on (closed) or off (open).

As indicated by column 194, when TRANS1_ACTIVE is high and TRANS2_ACTIVE is low, switch SW1 is on (because diode 144 is forward biased), switch SW2 is off (because diode 150 is not forward biased), and switch SW3 is off (because node 192 (NOT TRANS2_ACTIVE) is effectively open circuit, preventing diode 172 from being forward biased). In this configuration, combiner and divider circuit 125 can be used to convey signals exclusively between antenna 78 and transceiver circuit 110.

As indicated by column 196, when TRANS2_ACTIVE is high and TRANS1_ACTIVE is low, switch SW2 is on (because diode 150 is forward biased), switch SW1 is off (because diode 144 is not forward biased), and switch SW3 is off (because node 132 (TRANS1_ACTIVE) is low, preventing diode 172 from being forward biased. In this configuration, combiner and divider circuit 125 may convey radio-frequency signals exclusively between antenna 78 and transceiver circuit 120.

When TRANS1_ACTIVE is high and TRANS2_ACTIVE is high, switch SW1 is on (because diode 144 is forward biased), switch SW2 is on (because diode 150 is forward biased), and switch SW3 is on (because node 132 is high and node 192 is low, forward biasing diode 172.

Figure 9:
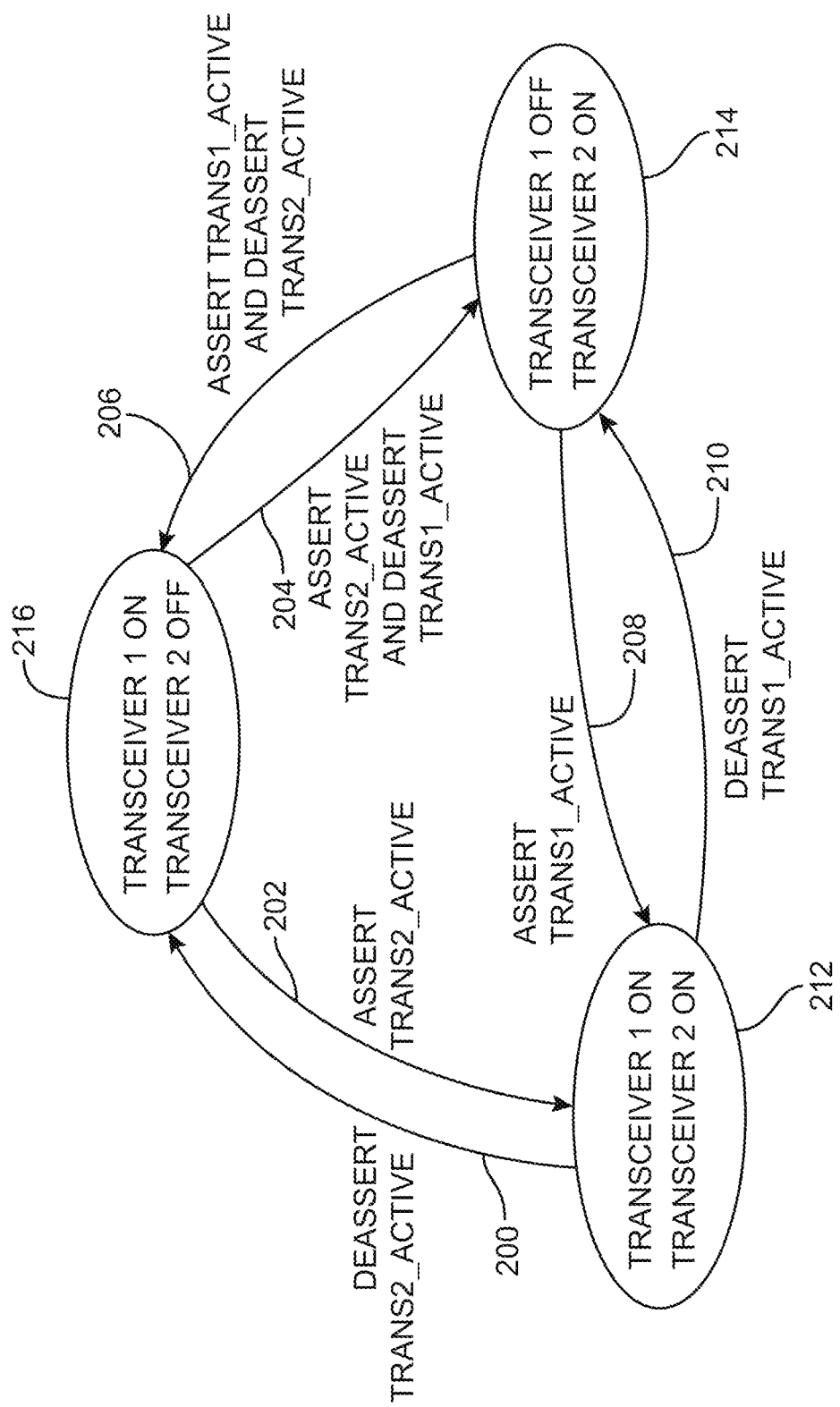
FIG. 9 is a state diagram illustrating operating modes of wireless communications circuitry having a configurable splitter circuit in a handheld electronic device in accordance with an embodiment of the present invention.

An illustrative state diagram illustrating modes in which device 10 and wireless communications circuitry 76 may operate is shown in FIG. 9. The embodiment of wireless communications circuitry 76 that is described in connection with the state diagram of FIG. 9 may have a first transceiver such as transceiver circuit 110 that handles a first type of wireless communications (e.g., wireless local area network communications, also sometimes referred to as WiFi communications or IEEE 802.11 communications) and may have a second transceiver such as transceiver circuit 120 that is used to handle Bluetooth communications. This type of arrangement is merely illustrative. In general, wireless communications circuitry 76 and transceiver and control circuitry 108 can be used to support any suitable communications protocols. The use of WLAN and Bluetooth communications protocols is described as an example.

As shown in FIG. 9, wireless communications circuitry 76 and device 10 may operate in at least three states, state 212, state 214, and state 216.

In state 214, Bluetooth circuit 120 is active in Bluetooth TX or RX mode, whereas WLAN circuit 110 is inactive. The state of an internal switch in transceiver 120 may be used to determine whether circuit 120 is transmitting or receiving wireless Bluetooth signals. State 214 corresponds to column 196 in the table of FIG. 8. During state 214, switch SW2 is on and switches SW1 and SW3 are off, so that signals may be conveyed between antenna 78 and transceiver circuit 120 with relatively low losses (e.g., about 1 dB).

When it is desired to operate both transceiver circuits 110 and 120 simultaneously, control paths such as paths 122 and 124 of FIG. 6 may be used to activate both circuits 110 and 120, while path 103 (FIG. 6) may be used to assert signal TRANS1_ACTIVE. The causes circuit 125 to transition from state 214 to state 212, as indicated by line 208. Circuit 125 can be returned to state 214 by deasserting signal TRANS1_ACTIVE, as indicated by line 210.

In state 212, both TRANS1_ACTIVE and TRANS2_ACTIVE high and switches SW1, SW2, and SW3 are on (closed), as indicated by column 198 in the table of FIG. 8. In this mode of operation, signals may be conveyed between both circuits 110 and 120 and antenna 78. There is a somewhat larger loss (e.g., about 3 dB) associated with using both transceiver circuits 110 and 120 simultaneously, but it is not necessary to drop transmitted data packets as it would be with the conventional antenna sharing arrangement described in connection with FIG. 3. The state of switch SW (FIG. 6) and the state of the internal switching circuitry of transceiver circuit 120 may be used to determine whether circuits 110 and 120 are transmitting or receiving data.

When it is desired to use only transceiver circuit 110, while deactivating transceiver circuit 120, control paths 122 and 124 can be used to turn transceiver circuit 120 off, while maintaining transceiver circuit 110 in its on condition. Path 103 may be used to deassert signal TRANS2_ACTIVE. This places circuit 215 in state 216, as indicated by line 200. Circuit 215 can be returned to state 212 by asserting signal TRANS2_ACTIVE, as indicated by line 202.

When in state 216, WLAN transceiver circuit 110 is active in RX or TX mode, whereas Bluetooth circuit 120 is inactive. The state of switch SW in transceiver circuit 110 may be used to determine whether transceiver circuit 110 is transmitting or receiving wireless LAN signals. State 216 corresponds to column 194 in the table of FIG. 8. During state 216, switch SW1 is on and switches SW2 and SW3 are off, so that signals may be conveyed between antenna 78 and transceiver circuit 120 with relatively low losses (e.g., about 1 dB). This is an improvement of about 2 dB relative to the loss exhibited when circuit 125 is in state 212 to support simultaneous operation of circuits 110 and 120.

As indicated by line 204, circuit 125 may be placed in state 214 by asserting signal TRANS2_ACTIVE and deasserting signal TRANS1_ACTIVE. Line 206 shows that circuit 125 can be returned to state 216 from state 214 by deasserting signal TRANS2_ACTIVE and asserting signal TRANS1_ACTIVE.

As described in connection with the embodiment of FIG. 7, circuit 125 may be controlled using two control signals (e.g., TRANS1_ACTIVE and TRANS2_ACTIVE). This is merely illustrative. Any suitable control arrangement may be used. For example, circuit 125 may be controlled using three control signals.

Figure 10:
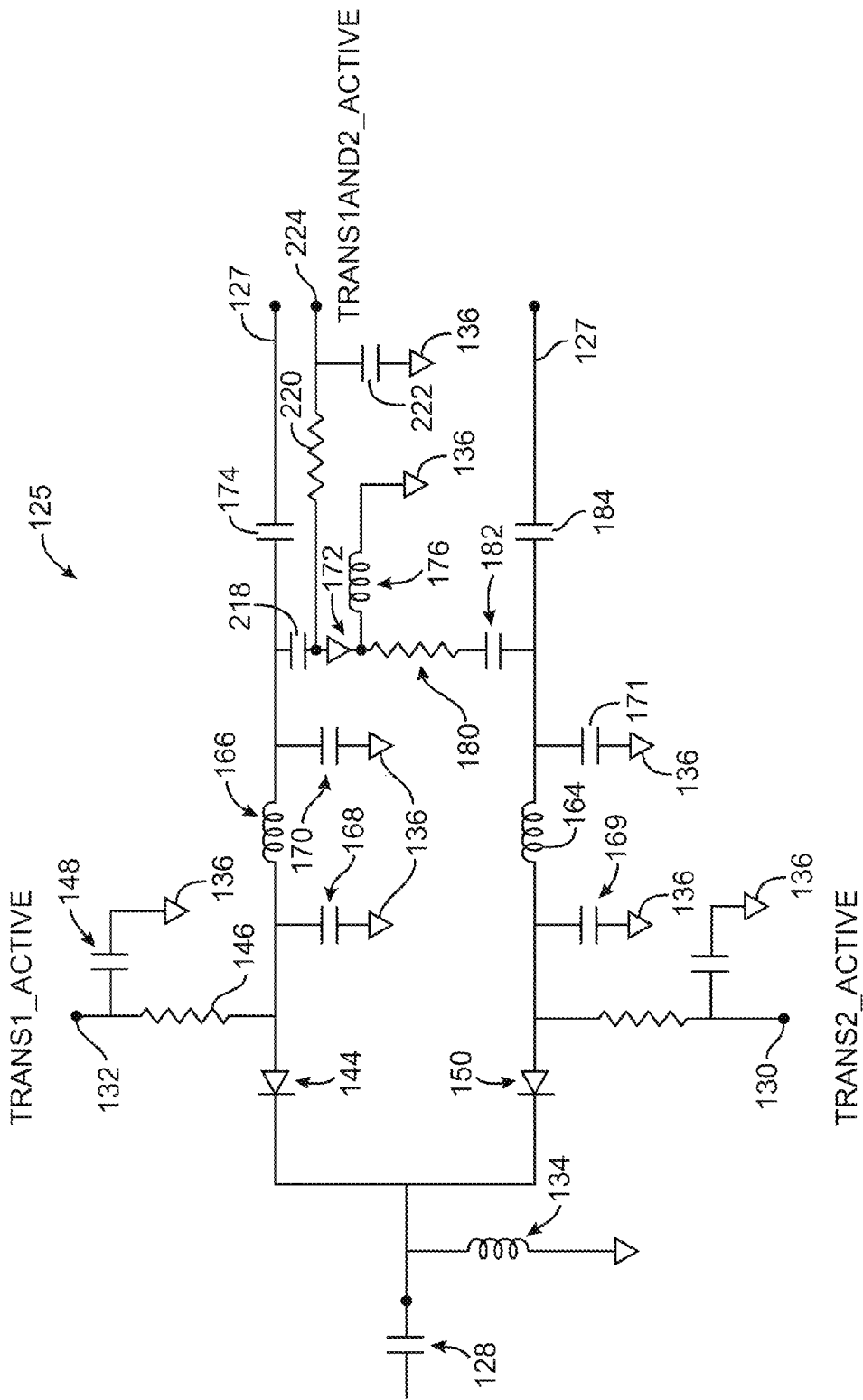
FIG. 10 is a circuit diagram of another illustrative configurable splitter circuit that may be used in a combining and divider circuit in a handheld electronic device in accordance with an embodiment of the present invention.

An embodiment of circuit 125 illustrating how three control signals may be used is shown in FIG. 10. In this embodiment, capacitor 218 (e.g., a 10 pF capacitor) serves to isolate switch SW3 from the control signal TRANS1_ACTIVE, so that state of switch SW3 is no longer controlled by signal TRANS1_ACTIVE.

Control signal TRANS1_ACTIVE may be taken high when transceiver 110 is active and may be taken low when transceiver 120 is active. Control signal TRANS2_ACTIVE may be taken high whenever it is desired to use transceiver 120 and may be taken low when transceiver 120 is not used. Control signal TRANS1AND2_ACTIVE may be taken high when it is desired to use both transceiver circuits 110 and 120 and may be taken low when both transceiver circuit 110 and transceiver circuit 120 are inactive.

When TRANS1AND2_ACTIVE is high on control terminal 224, current flows through resistor 220 (e.g., a 2100 ohm resistor), diode 172, and inductor 176 to ground 136, forward biasing diode 172 and turning switch SW3 on (i.e., placing switch SW3 in its closed position). When TRANS1AND2_ACTIVE is low, control terminal 224 is low and no current flows through resistor 220, diode 172, and inductor 176 to ground 136. In this situation, diode 172 is not forward biased and switch SW3 is in its open (off) position. Capacitor 222 may form a low pass filter to help prevent radio-frequency signals from reaching node 224.

The foregoing is merely illustrative of the principles of this invention and various modifications can be made by those skilled in the art without departing from the scope and spirit of the invention.

What is claimed is:

1. A wireless handheld electronic wireless device comprising:
   storage that stores data; processing circuitry coupled to the storage that generates data for wireless transmission and that processes wirelessly received data; and
   wireless communications circuitry, wherein the wireless communications circuitry comprises:
   transceiver circuitry comprising a first transceiver circuit and a second transceiver circuit, wherein the first and second transceiver circuits communicate using different communications protocols and a common radio-frequency frequency band;
   an antenna that handles radio-frequency signals in the common radio-frequency frequency band; and
   a radio-frequency combiner and divider circuit comprising a first terminal coupled to the antenna,
   second and third terminals coupled respectively to the first transceiver circuit and the second transceiver circuit, a first path between the first terminal and the second terminal, wherein the first path has a first switch, a second path between the first terminal and the third terminal, wherein the second path has a second switch, and a third path between the second and third terminals, wherein the third path has a third switch that is operable in an open position that opens the third path and a closed position that closes the third path,
   wherein when the wireless communications circuitry is operated in a first mode the radio-frequency signals are simultaneously conveyed between the first terminal and both the second and third terminals over the first and second paths.

2. The wireless handheld electronic wireless device defined in claim 1 wherein the first transceiver circuit comprises a wireless local area network (WLAN) transceiver circuit.

3. The wireless handheld electronic wireless device defined in claim 1 wherein the second transceiver circuit comprises a Bluetooth transceiver circuit.

4. The wireless handheld electronic wireless device defined in claim 1 wherein the first transceiver circuit comprises a wireless local area network (WLAN) transceiver circuit and the second transceiver circuit comprises a Bluetooth transceiver circuit.

5. The wireless handheld electronic wireless device defined in claim 1 further comprising:
   a first amplifier that amplifies radio-frequency signals transmitted from the first transceiver circuit;
   a second amplifier that amplifies radio-frequency signals before they are received by the first transceiver circuit; and
   a fourth switch coupled between the second terminal and the first transceiver circuit, wherein the fourth switch has a first position in which radio-frequency signals are received from the first amplifier and provided to the second terminal and a second position in which radio-frequency signals are received from the second terminal and provided to the second amplifier.

6. Wireless communications circuitry comprising:
a first wireless transceiver circuit that transmits and receives according to a first communications protocol in a given radio-frequency communications frequency band;
a second wireless transceiver circuit that transmits and receives according to a second communications protocol in the given radio-frequency communications frequency band, wherein the first and second communications protocols are different;
an antenna;
a radio-frequency combiner and divider circuit having first, second, and third switches that are responsive to control signals, wherein the combiner and divider circuit is coupled between the antenna and the first and second wireless transceiver circuits, wherein the wireless communications circuitry is operative in at least first, second, and third modes of operation, wherein:
in the first mode of operation, the first wireless transceiver circuit is active and the second wireless transceiver circuit is inactive and radio-frequency signals are conveyed exclusively between the antenna and the first wireless transceiver circuit through the combiner and divider circuit;
in the second mode of operation, the first and second wireless transceiver circuits are both active and radio-frequency signals are simultaneously transmitted from both the first and second wireless transceiver circuits through the combiner and divider circuit and through the antenna; and
in the third mode of operation, the first wireless transceiver circuit is inactive and the second wireless transceiver is active and radio-frequency signals are conveyed exclusively between the antenna and the second wireless transceiver circuit through the combiner and divider circuit.

7. The wireless communications circuitry defined in claim 6 wherein the combiner and divider circuit comprises a first diode in the first switch, a second diode in the second switch, and a third diode in the third switch.

8. The wireless communications circuitry defined in claim 6 wherein the first switch comprises a diode, wherein the combiner and divider circuit comprises at least a first control terminal, and wherein when the first control terminal is taken high by application of the control signals the diode is forward biased and the first switch is placed in a closed position.

9. The wireless communications circuitry defined in claim 6 wherein the combiner and divider circuit comprises at least first and second control terminals, wherein the first switch comprises a first diode, wherein the second switch comprises a second diode, wherein when the first control terminal is taken high by application of the control signals the first diode is forward biased and the first switch is placed in a closed position, wherein when the first control terminal is taken low by application of the control signals the first diode is not forward biased and the first switch is placed in an open position, wherein when the second control terminal is taken high by application of the control signals the second diode is forward biased and the second switch is placed in a closed position, and wherein when the second control terminal is taken low by application of the control signals the second diode is not forward biased and the second switch is placed in an open position.

10. The wireless communications circuitry defined in claim 6 wherein the combiner and divider circuit comprises at least first and second control terminals, wherein the first switch comprises a first diode, wherein the second switch comprises a second diode, wherein the third switch comprises a third diode, and wherein when the first control terminal is taken high by application of the control signals the first diode is forward biased and the first switch is placed in a closed position, wherein when the first control terminal is taken low by application of the control signals the first diode is not forward biased and the first switch is placed in an open position, wherein when the second control terminal is taken high by application of the control signals the second diode is forward biased and the second switch is placed in a closed position, wherein when the second control terminal is taken low by application of the control signals the second diode is not forward biased and the second switch is placed in an open position, and wherein when the first control terminal and second control terminal are taken high by application of the control signals the third diode is forward biased and the third switch is placed in a closed position.

11. A method for using wireless communications circuitry in a handheld wireless device that includes a radio-frequency combiner and divider circuit having a first terminal coupled to an antenna, second and third terminals coupled respectively to a first transceiver circuit and a second transceiver circuit, a first path between the first terminal and the second terminal, wherein the first path has a first switch, a second path between the first terminal and the third terminal, wherein the second path has a second switch, and a third path between the second and third terminals, and wherein the third path has a third switch, comprising:
storing data in storage on the portable wireless device;
with processing circuitry that is coupled to the storage, generating data for wireless transmission and processing wirelessly received data;
with the antenna and the first transceiver circuit in the wireless communications circuitry, communicating wirelessly in a communications frequency band according to a first communications protocol;
with the antenna and the second transceiver circuit in the wireless communications circuitry, communicating wirelessly in the communications frequency band according to a second communications protocol that is different than the first communications protocol;
when it is desired to simultaneously handle data with both the first and the second transceiver circuits, closing the first, second, and third switches and conveying radio-frequency signals between the antenna and both the first and second transceiver circuits through the radio-frequency combiner and divider circuit;
when it is desired to handle data with the first transceiver circuit while the second transceiver circuit is inactive, closing the first switch, opening the second and third switches, and conveying radio-frequency signals exclusively between the antenna and the first transceiver circuit; and
when it is desired to handle data with the second transceiver circuit while the first transceiver circuit is inactive, closing the second switch, opening the first and third switches, and conveying radio-frequency signals exclusively between the antenna and the second transceiver circuit.

12. The method defined in claim 11 further comprising:
when it is desired to transmit and receive wireless data through the antenna with the first transceiver circuit, placing the wireless communications circuitry in a wireless local area network transmit mode of operation in which the first transceiver circuit is active and transmits and receives wireless local area network radio-frequency signals through the antenna.

13. The method defined in claim 11 further comprising:
when it is desired to transmit and receive wireless data through the antenna with only the second transceiver circuit, placing the wireless communications circuitry in a mode of operation in which the first transceiver circuit is inactive and the second transceiver circuit is active and transmitting and receiving Bluetooth radio-frequency signals through the antenna.

14. The method defined in claim 11 wherein the first path has a radio-frequency impedance, the second path has a radio-frequency impedance, and the third path has a radio-frequency impedance, wherein the first radio-frequency impedance and the second radio-frequency impedance are equal, and wherein the third radio-frequency is larger than the first radio-frequency impedance, the method further comprising:
when it is desired to transmit wireless data through the antenna from the first transceiver circuit, activating the first transceiver circuit so that the first transceiver circuit transmits radio-frequency signals through the antenna; and
when it is desired to transmit wireless data through the antenna from the second transceiver circuit, activating the second transceiver circuit so that the second transceiver circuit transmits radio-frequency signals through the antenna.

15. The method defined in claim 11 wherein the first path has a radio-frequency impedance, the second path has a radio-frequency impedance, and the third path has a radio-frequency impedance, wherein the first radio-frequency impedance and the second radio-frequency impedance are equal, and wherein the third radio-frequency is larger than the first radio-frequency impedance, the method further comprising:
when it is desired to transmit wireless data through the antenna from both the first transceiver circuit and the second transceiver circuit simultaneously, activating the first and second transceiver circuits so that the first and second transceiver circuits transmit radio-frequency signals through the antenna.

16. Wireless communications circuitry comprising:
a first wireless transceiver circuit that transmits and receives according to a first communications protocol in a 2.4 GHz radio-frequency communications band;
a second wireless transceiver circuit that transmits and receives according to a second communications protocol in the 2.4 GHz radio-frequency communications band, wherein the first and second communications protocols are different;
an antenna that operates in the 2.4 GHz radio-frequency communications band;
a radio-frequency combiner and divider circuit comprising a first terminal coupled to the antenna, second and third terminals coupled respectively to the first wireless transceiver circuit and the second wireless transceiver circuit, a first path between the first terminal and the second terminal, wherein the first path has a first switch, a second path between the first terminal and the third terminal, wherein the second path has a second switch, and a third path between the second and third terminals, wherein the third path has a third switch, wherein the radio-frequency combiner and divider circuit is responsive to control signals and routes radio-frequency signals to and from the antenna, wherein the radio-frequency combiner and divider circuit is operative in at least first and second modes, and wherein:
in the first mode of operation, the first wireless transceiver circuit is active and the second wireless transceiver circuit is inactive and radio-frequency signals are conveyed exclusively between the antenna and the first wireless transceiver circuit through the combiner and divider circuit; and
in the second mode of operation, the first and second wireless transceiver circuits are both active and radio-frequency signals are simultaneously transmitted from both the first and second wireless transceiver circuits through the combiner and divider circuit and through the antenna.

17. The wireless communications circuitry defined in claim 16 further comprising a power amplifier that amplifies signals that are transmitted by the first wireless transceiver circuit during the first mode of operation, wherein the wireless communications circuitry is operative in a third mode of operation and wherein in the third mode of operation the first wireless transceiver circuit is inactive and the second wireless transceiver is active and radio-frequency signals are conveyed exclusively between the antenna and the second wireless transceiver circuit through the combiner and divider circuit.

18. The wireless communications circuitry defined in claim 16 further comprising a power amplifier that amplifies the signals that are transmitted by the first wireless transceiver circuit in the first mode of operation, wherein the wireless communications circuitry is operative in at least a third mode, wherein in the third mode of operation the first wireless transceiver circuit is inactive and the second wireless transceiver is active, and wherein the first wireless transceiver comprises a wireless local area network transceiver circuit.

19. The wireless communications circuitry defined in claim 16 wherein the first path has a first impedance in the 2.4 GHz radio-frequency communications band, wherein the second path has a second impedance in the 2.4 GHz radio-frequency communications band, and wherein the first impedance is equal to the second impedance.

20. The wireless communications circuitry defined in claim 16 wherein the first path has a first impedance in the 2.4 GHz radio-frequency communications band, wherein the second path has a second impedance in the 2.4 GHz radio-frequency communications band, wherein the third path has a third impedance in the 2.4 GHz radio-frequency communications band, wherein the first impedance is equal to the second impedance, wherein the third impedance is larger than the first impedance, and wherein the first and second paths each comprise an inductor.

21. A method for controlling a wireless handheld electronic device with wireless communications circuitry having a first wireless transceiver, a second wireless transceiver, an antenna, and a radio-frequency combiner and divider circuit having a first terminal coupled to the antenna, second and third terminals coupled respectively to the first transceiver circuit and the second transceiver circuit, a first path between the first terminal and the second terminal, wherein the first path has a first switch, a second path between the first terminal and the third terminal, wherein the second path has a second switch, and a third path between the second and third terminals, wherein the third path has a third switch that is operable in an open position that opens the third path and a closed position that closes the third path, the method comprising:
when it is desired to convey wireless data through the antenna using the first wireless transceiver while the second wireless transceiver is inactive, placing the wireless communications circuitry in a first mode of operation in which the first wireless transceiver circuit is active and handles radio-frequency signals passing through the radio-frequency combiner and divider circuit;

when it is desired to convey wireless data through the antenna using the second wireless transceiver while the first wireless transceiver is inactive, placing the wireless communications circuitry in a second mode of operation in which the second wireless transceiver circuit is active and handles radio-frequency signals passing through the radio-frequency combiner and divider circuit;

when it is desired to convey wireless data through the antenna using both the first and second wireless transceivers simultaneously, placing the wireless communications circuitry in a third mode of operation in which the first and second wireless transceiver circuits are active and handle radio-frequency signals passing through the radio-frequency combiner and divider circuit; and in the third mode of operation, closing the third switch.

22. The method defined in claim 21, wherein the first wireless transceiver circuit and the second wireless transceiver circuit operate according to different communications protocols, the method further comprising:

amplifying the transmitted radio-frequency signals from the first wireless transceiver circuit through a power amplifier when the wireless communications circuitry is in the first mode.

23. The method defined in claim 21, the method further comprising:

when in the first mode, transmitting and receiving wireless data with the first wireless transceiver circuit according to a wireless local area network protocol; and when in the second mode of operation, transmitting and wireless data with the second wireless transceiver circuit according to a protocol that is different than the wireless local area network protocol.

24. The method defined in claim 21 further comprising:

when it is desired to use both the first and second wireless transceiver circuits simultaneously in the third mode of operation, closing the first, second, and third switches.

25. The method defined in claim 21 further comprising:

in the first mode of operation, closing the first switch and opening the second and third switches;

in the second mode of operation, closing the second switch and opening the first and second switches; and in the third mode of operation, closing the first and second switches.

26. Wireless communications circuitry comprising:

transceiver circuitry comprising a first transceiver circuit and a second transceiver circuit, wherein the first and second transceiver circuits communicate using different communications protocols and a common radio-frequency frequency band;

an antenna that handles radio-frequency signals in the common radio-frequency frequency band; and a radio-frequency combiner and divider circuit comprising a first terminal coupled to the antenna, second and third terminals coupled respectively to the first transceiver circuit and the second transceiver circuit, a first path between the first terminal and the second terminal, wherein the first path has a first switch, a second path between the first terminal and the third terminal, wherein the second path has a second switch, and a third path between the second and third terminals, wherein the third path has a third switch that is operable in an open position that opens the third path and a closed position that closes the third path, and wherein when the wireless communications circuitry is operated in a first mode, the radio-frequency signals are simultaneously conveyed between the first and second terminals and between the first and third terminals.

27. The wireless communications circuitry defined in claim 26, further comprising a fourth switch that is connected between the second terminal and the first transceiver circuit and that has at least first and second positions, wherein when the wireless communications circuitry is operated in the first mode and the fourth switch is placed in the first position, radio-frequency signals are transmitted to the antenna from the first transceiver circuit while the second transceiver circuit is active and when the wireless communications circuitry is operated in the first mode and the fourth switch is placed in the second position, radio-frequency signals are received from the antenna by the first transceiver circuit while the second transceiver circuit is active.

28. The wireless communications circuitry defined in claim 26, wherein the combiner and divider circuit comprises a control signal path having three lines that receives three control signals, wherein when it is desired to operate the wireless communications circuitry in the first mode, the control signals direct the first switch to operate in a closed position, the control signals direct the second switch to operate in a closed position, and the control signals direct the third switch to operate in a closed position.

29. The wireless communications circuitry defined in claim 26, wherein the combiner and divider circuit comprises a control signal path having at least two lines, wherein the control signal path receives control signals and wherein when it is desired to operate the wireless communications circuitry in a second mode in which the first transceiver is active and the second transceiver is inactive, the control signals direct the first switch to operate in a closed position, the control signals direct the second switch to operate in an open position, and the control signals direct the third switch to operate in an open position.

30. The wireless communications circuitry defined in claim 26, wherein the combiner and divider circuit comprises a control signal path that receives control signals and wherein:

when it is desired to operate the wireless communications circuitry in a second mode in which the first transceiver is active and the second transceiver is inactive, the control signals direct the first switch to operate in a closed position, the control signals direct the second switch to operate in an open position, and the control signals direct the third switch to operate in an open position; and when it is desired to operate the wireless communications circuitry in a third mode in which the first transceiver is inactive and the second transceiver is active, the control signals direct the first switch to operate in an open position, the control signals direct the second switch to operate in a closed position, and the control signals direct the third switch to operate in an open position.

* * * * *

UNITED STATES PATENT AND TRADEMARK OFFICE
CERTIFICATE OF CORRECTION

PATENT NO. : 7,818,029 B2  Page 1 of 1
APPLICATION NO. : 11/786606
DATED : October 19, 2010
INVENTOR(S) : Louie J. Sanguinetti It is certified that error appears in the above-identified patent and that said Letters Patent is hereby corrected as shown below:

On sheet 2 of 10, in Figure 2, Box No. 44, line 2, delete "TRANCEIVER" and insert -- TRANSCEIVER --, therefor.

In column 1, line 11, delete "electronic-devices" and insert -- electronic devices --, therefor.

In column 6, line 38, delete "Si" and insert -- S1 --, therefor.

Signed and Sealed this
Fifteenth Day of November, 2011

David J. Kappos
*Director of the United States Patent and Trademark Office*